US006697150B1

(12) United States Patent
Galtarossa et al.

(10) Patent No.: US 6,697,150 B1
(45) Date of Patent: Feb. 24, 2004

(54) PROCESS AND APPARATUS FOR MEASURING POLARIZATION DISPERSION IN OPTICAL FIBERS

(75) Inventors: Andrea Galtarossa, Padua (IT); Luca Palmieri, Turin (IT); Marco Schiano, Turin (IT); Tiziana Tambosso, Turin (IT)

(73) Assignee: Telecom Italia Lab S.p.A., Turin (IT)

( * ) Notice: Subject to any disclaimer, the term of this patent is extended or adjusted under 35 U.S.C. 154(b) by 0 days.

(21) Appl. No.: 10/129,025

(22) PCT Filed: Nov. 15, 2000

(86) PCT No.: PCT/EP00/11305
§ 371 (c)(1),
(2), (4) Date: Apr. 29, 2002

(87) PCT Pub. No.: WO01/37459
PCT Pub. Date: May 25, 2001

(30) Foreign Application Priority Data

Nov. 16, 1999 (IT) .......................................... TO99A0989

(51) Int. Cl.[7] .............................................. G01N 21/00
(52) U.S. Cl. ...................................................... 356/73.1
(58) Field of Search ........................ 356/73.1; 359/110, 359/130, 109, 161, 124, 125, 135, 188; 250/227.18, 227.23, 227.14, 227.27

(56) References Cited

FOREIGN PATENT DOCUMENTS

EP      0 784 388 A2 *   7/1997
WO    WO A 9836256      8/1998

OTHER PUBLICATIONS

Galtarossa et al, "single–end polarization mode dispersion measurement using backreflected spectra through a linear polarizer", Journal of Lightwave Technology, Oct. 1999, IEEE, USA, vol. 17, No. 10, pp. 1835–1842.*

Single–End Polarization Mode Dispersion Measurement Using Backreflected Spectra Through A Linear Polarizer; Journal of Lightwave Technology, vol. 17, No. 10, 10/99, pp. 1835–1842.

* cited by examiner

*Primary Examiner*—Tu T. Nguyen
(74) *Attorney, Agent, or Firm*—Herbert Dubno (57) ABSTRACT

The process and apparatus to enable measurement of polarization dispersion of a single-mode optical fibre by launching measurement light at one end of the fibre and analyzing polarization of the light reflected by the other end and collected at such launch end. Optical or electronic masking of light reflected by the near end of the fibre is performed during launch.

13 Claims, 7 Drawing Sheets

PROCESS AND APPARATUS FOR MEASURING POLARIZATION DISPERSION IN OPTICAL FIBERS

CROSS REFERENCE TO RELATED APPLICATIONS

This application is a national stage of PCT/EP00/11305 filed Nov. 15, 2000 and based upon Italian National Application TO 99A 000 989 filed Nov. 16, 1999 under the International Convention.

FIELD OF THE INVENTION

This invention relates to the characterization of optical components and more specifically to a process and an apparatus for measuring polarization dispersion in single-mode optical fibers.

BACKGROUND OF THE INVENTION

Polarization dispersion (commonly known in the literature as PMD from the initials of the English denomination "Polarization Mode Dispersion") is defined as the differential group delay between two orthogonally polarized modes, which causes digital communication system impulses to widen or analog communication system impulses to distort. This phenomenon is due to fiber manufacturing imperfections (elliptical nucleus and material anisotropy) or to external mechanical stresses (flattening, folding, torsion and the like) that make propagating light divide into two local polarization modes that propagate at different speeds. Unless properly controlled, this phenomenon can limit the performance of high capacity (10 Gbit/s or more) optical systems or even inhibit operation.

Dispersion of the polarization of the fibers and components with which new high capacity optical networks are manufactured must therefore be accurately measured or characterized in terms of polarization dispersion in view of the installation of new systems and where existing systems are being enlarged.

A number of techniques for measuring polarization dispersion have been the subject of international regulations. In particular, Recommendation ITU-T G.650 proposes using analysis of the Jones matrix self-values, the Poincaré sphere and the fixed polarizer and interferometry methods. All these techniques enable the measurement of the differential delay of the average group, namely of the magnitude that best characterizes polarization dispersion of optical fibers and its influence on transmission systems.

All the measurement methods mentioned above have the drawback of requiring access to both fiber ends. These techniques in fact analyze the signal transmitted by the optical signal under test and thus require the use of one end for launching the test optical signal and the other end for measuring the variations induced by the fiber on the signal polarization features. This limitation is clearly irrelevant for laboratory or factory measurements on optical fibers and cables wound on coils (where the two ends are at a maximum distance of a few meters) or on optical fiber components, but makes polarization dispersion measurement difficult on the fibers making up the transmission lines of already installed optical systems where the opposite ends of the optical fibers can be placed at a distance of many tens of kilometers. In these cases, at least two operators connected to one another are required; one for checking the optical source and the other for checking the polarization analyzer, or connection must be made between the two instruments for measurement control transmission. Both solutions are complicated and costly.

Techniques for measuring polarization dispersion based on the analysis of the signal reflected from the far end of the optical fiber have already been proposed, requiring access to one end only of the optical fiber being measured, with remarkable time and resource savings.

In particular, the article "Single-End Polarization Mode Dispersion Measurement Using Backreflected Spectra Through A Linear Polarizes" in the Journal of Lightwave Technology, Volume 17, Number 10 of October 1999, pages 1835–1842, by the Inventors, describes an apparatus whose light issued by a tuneable source is made first to pass through a polarization control device that gives it the required polarization status and is then launched onto the fiber by means of a polarization-insensitive directional coupler. This unit receives the light emitted by the far end of the fiber and sends it to a polarization analyzer connected to a processing device that performs the processing necessary to achieve polarization dispersion.

Another polarization dispersion analysis apparatus based on light reflected from the fiber end is described in WO-A-9836256 by A. Galtarossa. This apparatus is however based on the principles of time-dependent optical reflectometry and is conceived to measure polarization dispersion spatial distribution rather than its average value along the whole length of the connection.

When performing measurements accessing only one end of the fiber, light reflected at the launch end must be eliminated as it would add to the light reflected by the far end and alter measurements. The article by the inventors mentioned above suggested using an angle connector for this purpose, to launch the light. The use of an angle connector is a solution suitable for laboratory testing but not for field measurements as it is not commonly applied in field systems.

OBJECT OF THE INVENTION

The object of the invention is to provide a process and an apparatus for measuring polarization dispersion based on backreflected light analysis, which can be easily used on already installed systems.

SUMMARY OF THE INVENTION

The process covered by the invention provides for sending to a nearby end of the fiber measurement light at different wavelengths with a plurality of polarity conditions for each wavelength, collection of the corresponding light reflected by the remote end of the fiber and leaving through the said near end, and polarization analysis and processing of the polarization analysis results. It is characterized by the fact that during transmission of measurement light in the fiber, the reflected light from such near end is masked to prevent it from reaching the facilities performing the polarization analysis and overlapping such reflected light from the far end.

The apparatus for achieving the process consists of:
a wavelength tuneable source to subsequently generate different wavelengths included within a preset wavelength interval;
polarization control means to supply a sequence of polarization conditions to the light emitted by the source for each of such wavelengths;
means for launching into a near end of the fiber the light from the polarization control means and collecting the light reflected by a remote end of the fiber itself and leaving such near end;

means for analyzing polarization, receiving light collected by the launch and collection means; and processing and control means to perform the processing required for obtaining the value of polarization dispersion from the information supplied by the polarization analysis means and to check the polarization analysis means and the polarization control means, and is characterized by the fact that the measurement light launch means and backreflected light collection means include means for masking light reflected by the near end of the fiber during launch to prevent it from overlapping with light reflected by the remote end of the fiber in the polarization analysis means.

BRIEF DESCRIPTION OF THE DRAWING

For further clarification, reference is made to the enclosed drawings, where.

SPECIFIC DESCRIPTION

The single line arrows of the figures indicate the itinerary of optical signals (achieved by means of optical fiber sections) and the double line arrows indicate the itinerary of electrical signals. Similar components are indicated with the same references in all figures.

Figure 1:
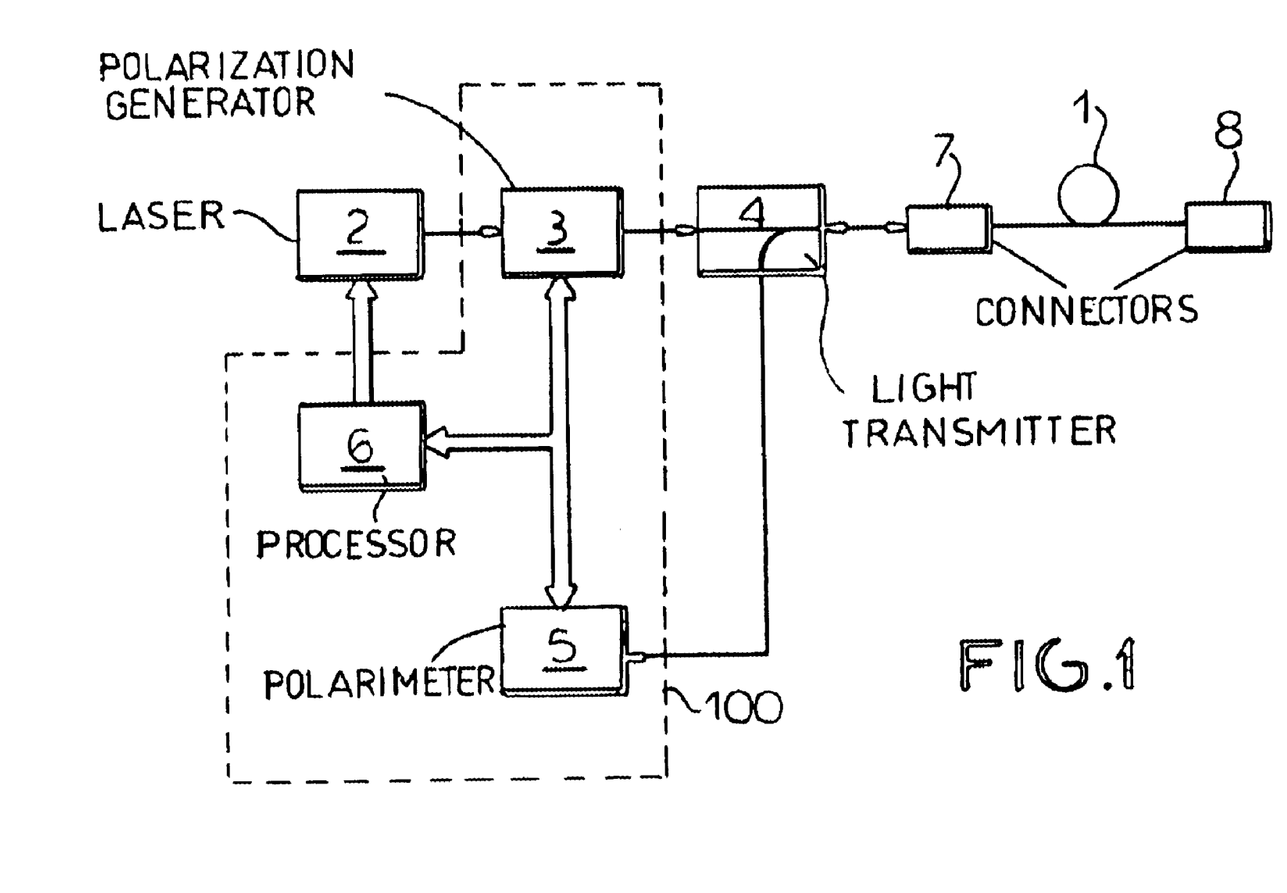
FIG. 1 is the basic diagram of an apparatus for measuring polarization dispersion of an optical fiber starting from its backreflected light.

With reference FIG. 1, an apparatus for measuring polarization dispersion of an optical fiber 1 starting from the light backreflected by the same fiber includes:

a wavelength tuneable light source, i.e. a laser 2 to generate a light whose wavelength is made to change stepwise in a preset wavelength interval;

a polarization control device 3 or polarization state generator, which gives the light emitted by laser 2 the polarization states required for the measurement in question, in particular three polarization states at 0°, 45° and 90°, for each of the different wavelengths;

a device 4 for sending the fiber 1 the light leaving polarization state generator 3 and collecting the light reflected at the remote end of the fiber, device 4 is represented here as a simple optical coupler with two unidirectional ports for transmitted light input and reflected light output respectively and a bi-directional port for connection to the fiber;

a polarimeter 5 that receives backreflected light from the coupler device 4 and 5 analyses its polarization state; and a processor 6 that operates as a system monitoring device by controlling wavelength selection and timing the various measurement stages, besides processing the data supplied by polarimeter 5.

Note that even though elements 3, 5 and 6 of the functional diagram drawing 10 are represented as separate as they actually perform distinct functions, backreflected sight measurement instruments are available commercially that include all such blocks. An example is the PROFILE PAT 9000 instrument manufactured by the Company PROFILE GmbH of Munich, Germany. Dotted line block 100 is the measurement instrument real and proper.

An apparatus of this type essentially corresponds to the one illustrated in the article by the inventors. The processing operations to be completed for measuring polarization dispersion are described in the article mentioned and need not be reported in detail here. Suffice it to recall that device 6 calculates average group differential delay of the backreflected field in accordance with one of the standard techniques mentioned above and immediately calculates from such value the average group delay of the transmitted field, which is the parameter to be actually identified, since a simple proportion exists between the two values, as described in the article.

The drawing also illustrates connectors 7, 8 placed at fiber 1 nearby end 25 (launch) and remote end (reflection). Measurement of backreflection-based dispersion requires that the contribution to reflected power by Fresnel reflection at the remote end 8 be prevalent over the contribution by Rayleigh backreflection. The necessary conditions for obtaining this, are also discussed in detail in the article by the inventors.

As mentioned above, correct polarization dispersion measurement requires that polarimeter 5 be prevented from receiving light reflected by the fiber 1 nearby end, that is to say by connector 7. The invention provides an apparatus capable of achieving this condition compatibly with the need to perform field measurements.

FIGS. 2 to 5 represent some forms of implementation of the invention based on a polarimeter 5 optical isolation during light measurement launch into the fiber and therefore an optical masking of the light reflected by the remote fiber end. These solutions enable use of commercially available instruments and require using optical components external to the apparatus itself.

Figure 2:
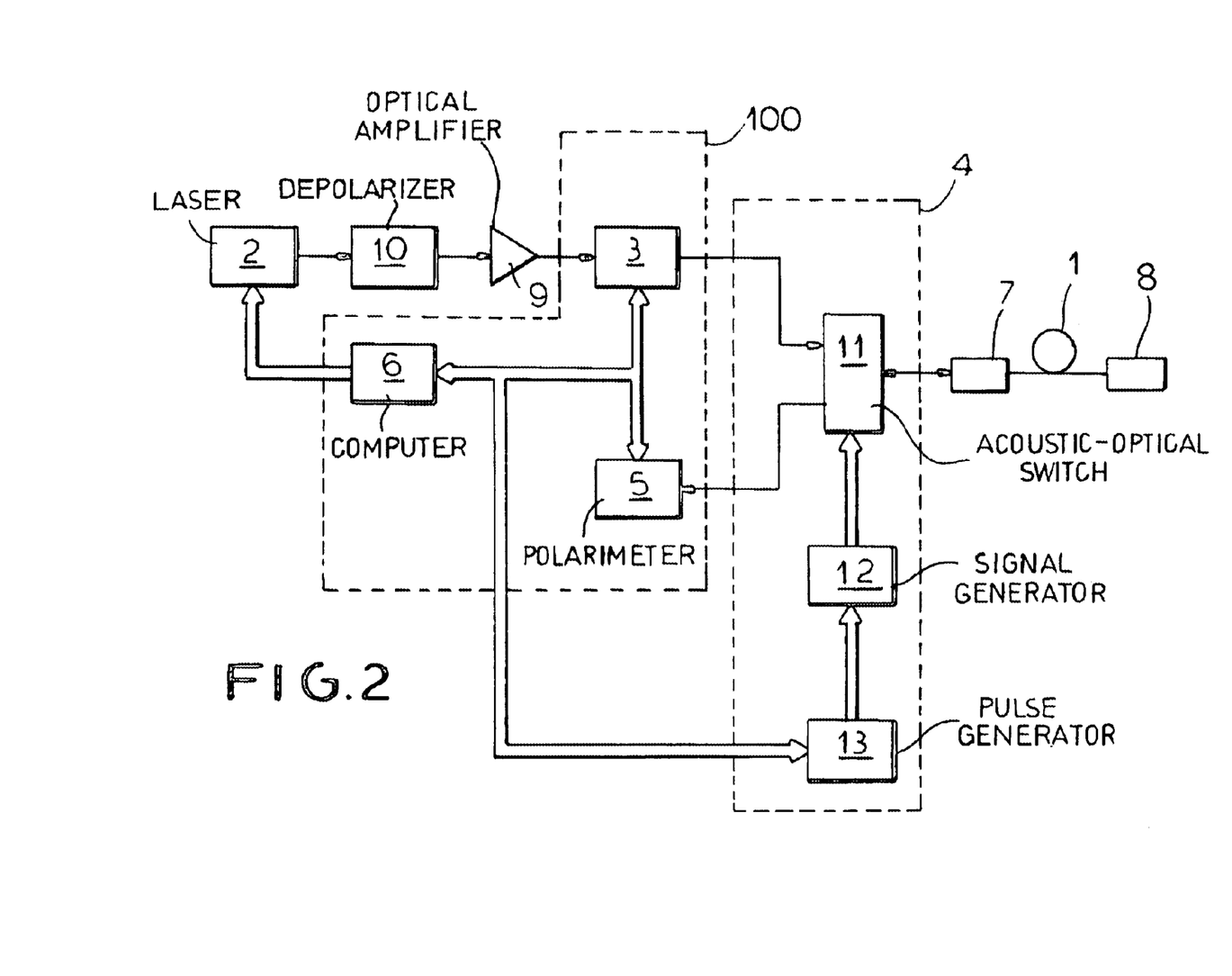
FIG. 2 is the diagram of an initial form of implementation of the apparatus according to the invention with optical masking of the signals backreflected by the nearby connector.

FIG. 2 shows that an optical amplifier 9 and a depolarizer 10 are inserted between laser 2 and polarization state generator 3. Amplifier 9 obviously has the purpose of guaranteeing enough power for the measurement. Depolarizer 10 is required because optical amplifier 9 in polarization behaves differently at different wavelengths and could therefore make generator 3 produce polarization states with different power at different wavelengths.

Connection device 4 consists of an acoustic-optical switch 11 suitable to alternately connect fit, to polarization state generator 3 or polarimeter 5 to prevent polarimeter 5 from being reached by the light backreflected by connector. Switch 11 is piloted conventionally by a radio frequency signal generator 12 with the purpose of keeping switch 11 in one of its two positions (such as the position in which switch 11 connects fiber 1 to polarization state generator 3, for instance). The radio frequency signal generator is in its turn controlled by an impulse generator 13 that generates impulses at a repeat frequency and having a duration selected based on fiber length and the features of the polarimeter used. In particular, impulses will be present in the periods during which measurement light must be launched to the fiber and absent when light backreflected by remote connector 8 must be collected with the polarimeter. Radio frequency generator 12 is deactivated during the periods of absence of impulses and switch 11 connects fiber 1 to polarimeter 5, while the latter is optically isolated during measurement light launch.

Bearing in mind that impulse frequency and duration are related to the length of the specific fiber 1 to be characterized, impulse generator 13 will be advantageously slaved to control computer 6 where fiber information is input to enable proper processing of the backreflected signal.

Figure 3:
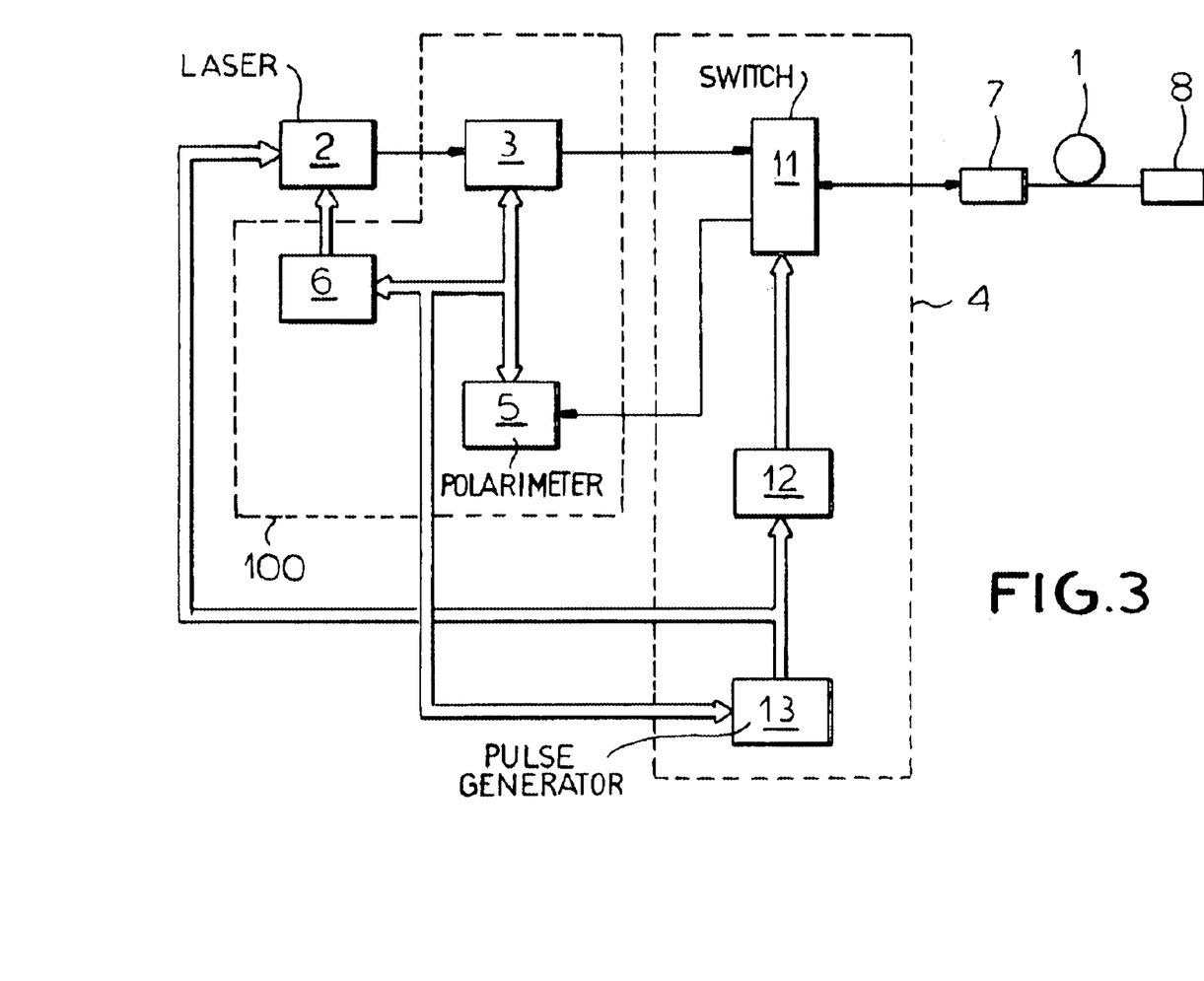
FIGS. 3, 4, 5 are diagrams of some variants to FIG. 2.

In the variant of FIG. 3, use is still made of acoustic-optical switch 11 to isolate polarimeter 5 from fiber 1 during measurement light launch. Impulse generator 13 also modulates laser 2 with all/nothing modulation to send an impulsive signal to fiber 1 instead of continuous light. The switch thus operates in a synchronous mode by generating measurement impulses. In this arrangement, the optical amplifier should preferably not be connected to the itinerary of laser 2 output impulses as the amplifier is known to be capable of producing excess power peaks. The impulsive signal is also sufficiently powerful by itself for the required measurement dynamics.

Figure 4:
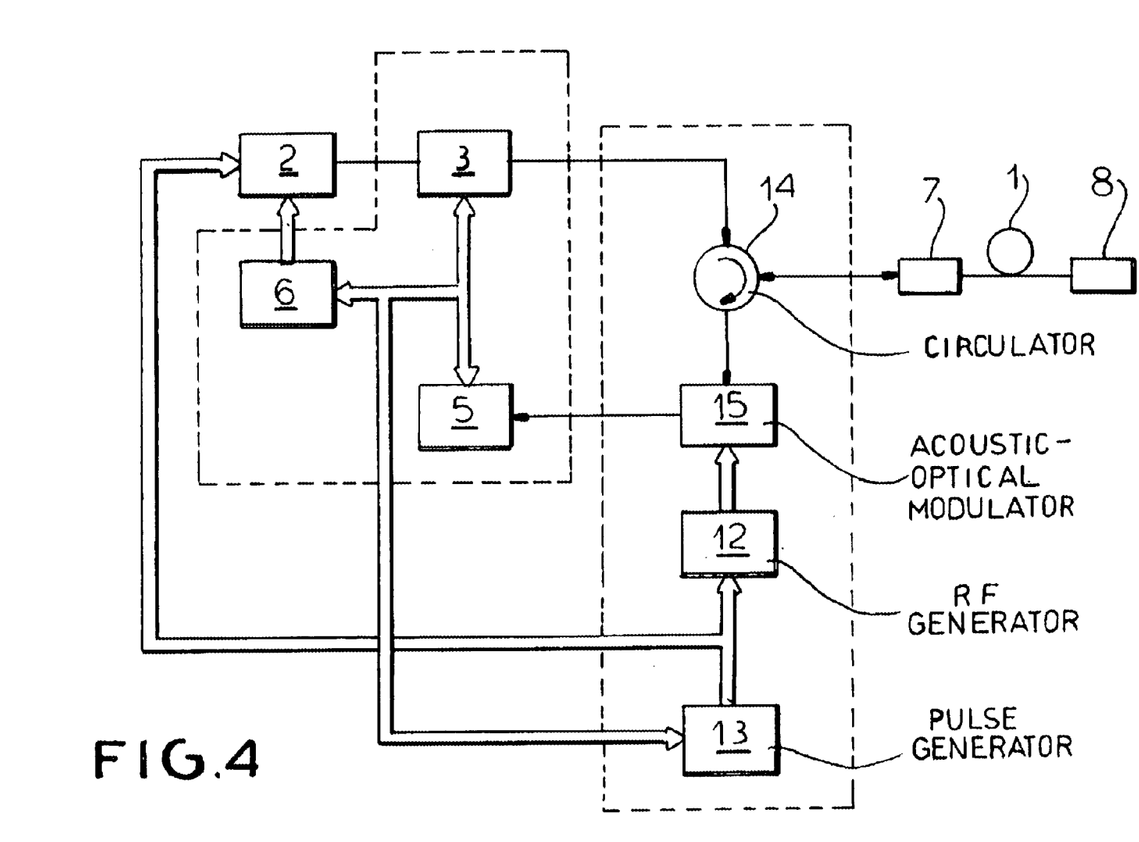

FIG. 4 shows a variant of the device of FIG. 3. Instead of alternately connecting the nearby fiber end to polarization state generator 3 or to polarimeter 5, all/nothing modulation of light transmitted to the polarimeter is used and cancellation takes place at light measurement transmission to fiber 1. Polarization state generator 3 and polarimeter 5 are respectively connected to an input and an output port of a three-way circulator 14 provided with a bi-directional input-output port connected to fiber 1. An acoustic-optical modulator 15 is placed between circulator output port 14 and polarimeter 5 suitable to introduce all/nothing modulation into the signals that cross it. Similarly to switch 11 of FIG. 3, modulator 15 is piloted by radio frequency signal generator 12 controlled by impulse generator 13 that modulates laser 2.

Figure 5:
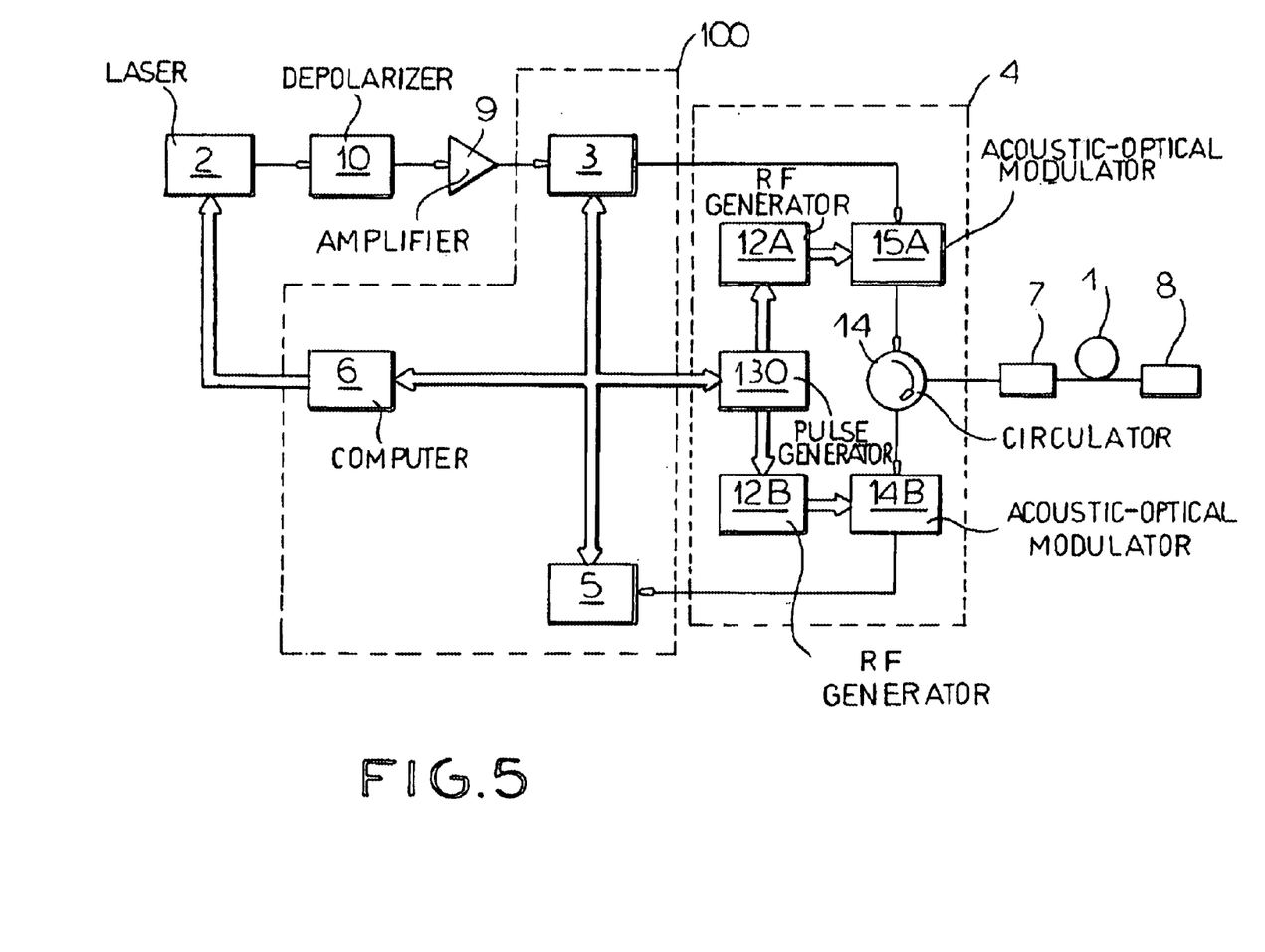

In the diagram of FIG. 5 related to a solution where continuous light is sent to the fiber, use is still made of a three-way circulator 14 connected to polarization state generator 3, fiber 1 and polarimeter 5, as in the diagram of FIG. 4. In this case light backreflected by connector 7 is masked by a couple of acoustic-optical modulators 15A, 15B respectively located between polarization state generator 3 and circulator 14 input and between the latter output and polarimeter 5 input. The two modulators are piloted by their respective radio frequency signal generators 12P, 12B controlled by impulse generator 130. The two modulations must obviously be complementary.

Figure 6:
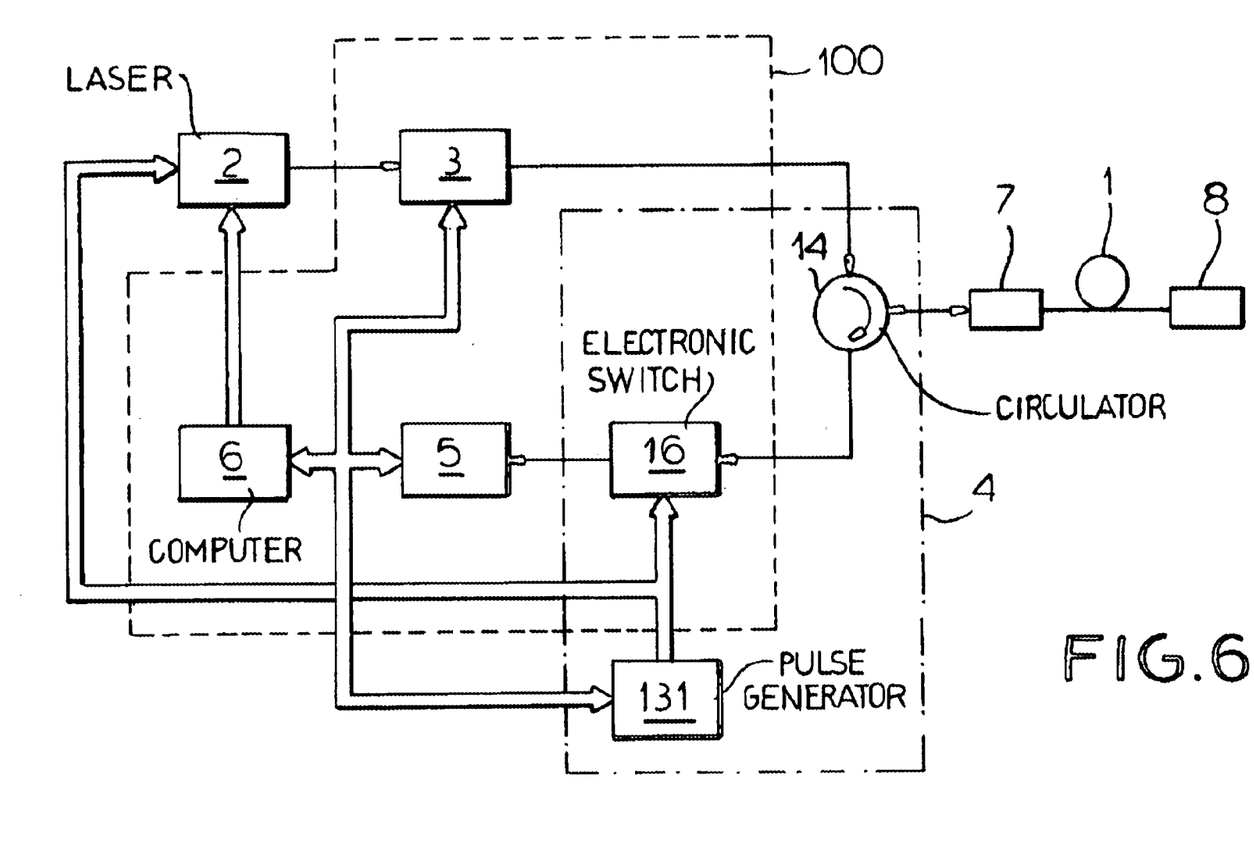
FIG. 6 is the diagram of a second form of implementation of the apparatus according to the invention with electrical masking of the signals backreflected by the nearby connector.
Figure 7:
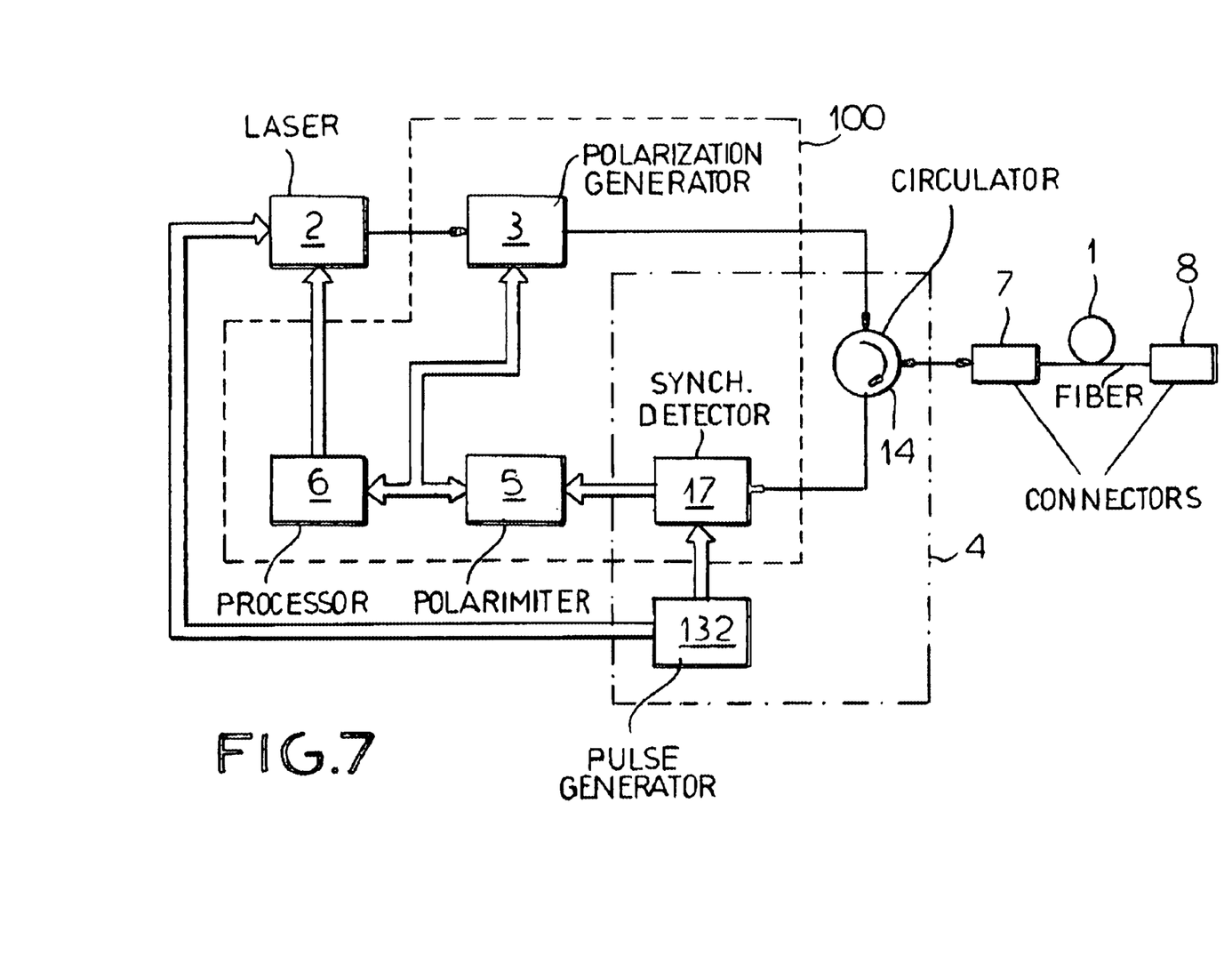
FIG. 7 is the diagram of a variant to FIG. 6.

FIGS. 6 and 7 show two possible solutions to mask backreflected light with electronic instruments. A solution of this type presents economic advantages over the use of optical components. The functions of connection device 4 of FIG. 1 are partially performed in these implementations by incorporating circuits in instrument 100 In both these solutions, use is made of impulsive light obtained by modulating laser 2 with an impulse generator similar to the one described in the previous forms of implementation.

In particular, FIG. 6, which essentially corresponds to FIG. 4, still uses optical circulator 14 to connect fiber 1 to measurement instrument 100. Impulse generator 131 modulating laser 2 acts on the electronic circuits of polarimeter 5 to disable it during measurement light launch. This function is represented in the diagram by the presence of an electronic switch 16, between circulator 14 output port and polarimeter 5, controlled by the same laser modulation impulses.

FIG. 7 shows a synchronous detector 17 between circulator 14 output and polarimeter 5 input, piloted by an impulse generator 132 to give detector 17 the necessary reference signal at the same frequency as the impulses controlling laser 2. Technicians are aware that synchronous detector 17 can distinguish between signals reflected at fiber remote end 8 and those reflected at nearby end 7, based on the phase relationship with the reference signal, by only sending the former to polarimeter 5.

The above description was obviously only given as a non-limiting example and variants and modifications are possible without leaving the protection scope of the invention. With suitable methods well known to technicians, optical amplifier 9 can also be used for an impulsive source or continuous light can be used even in implementations where masking is with electronic circuits. Furthermore, the means used for masking the light reflected by the nearby end can consist of equivalent devices. It will for instance be possible to use optical switches instead of acousticoptical components, as long as they are produced with a technology guaranteeing sufficiently fast response (as an example, fiber 1 connections may need to be switched at an interval of between 100 and 500 ns), or to use electro-optical modulators, electromechanical modulators and the like.

What is claimed is:

1. A process for measuring polarization dispersion of a single-mode optical fiber (1), whereby transmitted measurement light is sent to a nearby end (7) of the single mode optical fiber at various different wavelengths, a reflected measurement light reflected by the a fiber remote end (8) is collected and analyzed with reference to polarization by a measurement device (100) and the results of such polarization analysis are processed, wherein when the transmitted measurement light is sent to the fiber (1), a light reflected by the nearby end (7) is masked by electronically disabling the reading of the light reflected by the nearby end whereby said electronically disabling prevent said measurement device (100) from performing such polarization analysis on the light reflected by the nearby end (7) and from overlapping such reflected measurement light reflected by the fiber remote end (8) to the light reflected by the nearby end.

2. The process as defined in claim 1 wherein the masking includes the operation of periodically disabling a polarization analysis device (5) during time intervals corresponding to the launch of the transmitted measurement light into fiber (1).

3. The process as defined in claim 2 wherein the periodic disabling is controlled by a sequence of impulses of frequency and duration related to the length of the fiber under review.

4. The process as defined in claim 3 wherein the sequence of impulses is also supplied to a source of the transmitted measurement light in order to generate impulsive light.

5. The process as defined in claim 1 wherein the transmitted measurement light is continuous and by the fact that light depolarization and optical amplification is performed on the transmitted measurement light.

6. The process as defined in claim 1 wherein the masking includes synchronous detection of the transmitted measurement light transmitted to a polarization analysis device (5) on command by a reference signal having the same frequency as that of a sequence of impulses and frequency and duration related o the length of the and controlling the generation of an impulsive measurement light by a transmitted measurement light source (2).

7. An apparatus for measuring polarization dispersion of a single-mode optical fiber (1), inclusive of comprising:
   a wavelength tuneable light source (2) to subsequently generate a light of different wavelengths included in a preset interval of wavelengths;
   a polarization control circuit (3) to sequentially impose different polarization states to the light emitted by the source (2) for each of such wavelengths;

a launching and collecting device(4) both for launching the light emitted by the polarization control circuit (3) into a fiber (1) nearby end (7) and for collecting a reflected measurement light reflected by a fiber remote end (8);

a polarization analysis device (5) for receiving the reflected light from the launch and collection device (4); and a measurement device (100) to perform the processing operations required both to obtain the value of polarization dispersion from the information supplied by the polarization analysis device (5) and to control the source (2), the launching and collecting device (4) including an electronic masking circuit for electronically disabling the reading of a light reflected by the fiber (1) nearby end during launch, thereby preventing said measurement device (100) from performing polarization analysis on the light reflected by said nearby end (7) and from overlapping such reflected measurement light reflected by the remote end (8) to the light reflected by the nearby end (7).

8. The apparatus as defined in claim 7 wherein said electronic masking circuit (16, 131) includes disabling circuit for disabling the polarization analysis device (5) at time intervals during which measurement light is launched to fiber (1).

9. The apparatus as defined in claim 8 wherein said disabling circuit includes an electronic shutter (16) controlled by an impulse generator (131) of frequency and duration related at least to the length of the fiber.

10. The apparatus as defined in claim 9 wherein said impulse generator (131) is connected to said source (2) to control the emission of measurement light impulses.

11. The apparatus as defined in claim 7 wherein said source (2) is a source of continuous and depolarized light and optical amplification circuits (9) are provided between the source (2) and the polarization control circuit (3) for amplifying the light leaving the source.

12. The apparatus as defined in claim 7 wherein said source (2) is a source of impulsive light controlled by an impulse generator (132) the output pulse of which have a frequency and duration related to the length of the fiber and that said electronic masking circuit (17, 132) includes a synchronous detection circuit (17) for detection of light sent to the polarization analysis device (5) and synchronous with the emission of measurement light impulses.

13. The apparatus as defined in claim 12 wherein the synchronous detection circuit (17) is connected to said impulse generator (132) which is suitable to generate and supply the synchronous detection circuit (17) with a reference signal (132) having the same frequency as that of the measurement light impulses.

* * * * *